K. W. LINDMAN.
BALL BEARING.
APPLICATION FILED APR. 10, 1918.
1,425,872.
Patented Aug. 15, 1922.
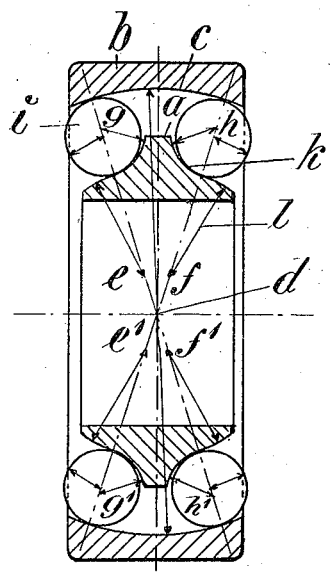
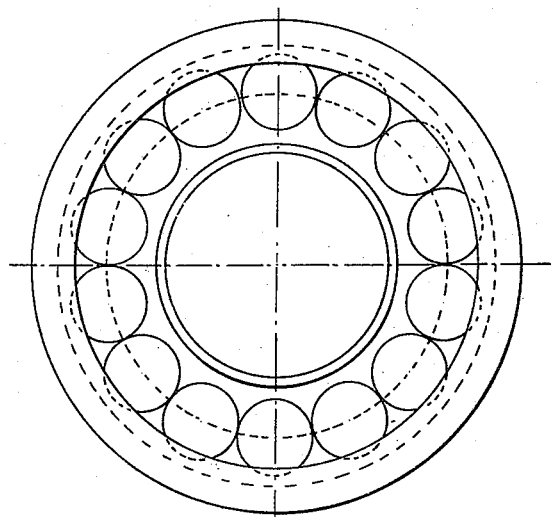
Inventor:
Konrad W. Lindman

UNITED STATES PATENT OFFICE.

KONRAD WERNER LINDMAN, OF STOCKHOLM, SWEDEN, ASSIGNOR, BY MESNE ASSIGNMENTS, TO NORDISKA KULLAGER AKTIEBOLAGET, OF STOCKHOLM, SWEDEN, A LIMITED COMPANY OF SWEDEN.

BALL BEARING.

1,425,872.   Specification of Letters Patent.   Patented Aug. 15, 1922.

Application filed April 10, 1918. Serial No. 227,616.

*To all whom it may concern:*

Be it known that I, KONRAD WERNER LINDMAN, subject of the King of Sweden, residing at Vastra Trädgårdsgatan 4, Stockholm, in the Kingdom of Sweden, have invented certain new and useful Improvements in Ball Bearings; and I do hereby declare the following to be a full, clear, and exact description of the invention, such as will enable others skilled in the art to which it appertains to make and use the same.

The present invention relates to double row ball bearings of the type in which the outer ring has a spherical bearing surface and the inner ring has either a spherical bearing surface or two ball paths circular in axial section. Bearings of this type hitherto known are so constructed that in order to make it possible to insert the balls in their place in the bearing the said rings must either be turned sideways in relation to each other, in which position the balls easily may drop out of their position, or special openings must be formed in the edges of the ball races in order to make it possible to insert the balls in their position.

It is an object of the present invention to design a bearing which shall be free from these objections, the balls being readily positioned without special intakes and yet automatically retained in their paths during use. In the furtherance of this object I employ a double row ball bearing comprising inner and outer bearing members each made in one piece. The bearing surface of the outer member is in the form of an equatorial zone of a sphere having its center at the center of the bearing member. The inner member is provided with two bearing surfaces one on each side of a medial flange, these bearing surfaces having in axial cross-section the form of compound or S-shaped curves, the concave surfaces of which are adjacent the flange and the convex surfaces facing outwardly.

In bearings of this type, it is desirable that the balls work toward a medial plane of the bearing member and thus automatically retain their positions during use. For this reason, the curves of the two co-operating bearing surfaces of each race are made to converge toward such medial plane.

It is also desirable that the balls are seated upon concave bearing surfaces rather than plane or convex as this decreases the unit pressure exerted upon the balls.

It is the object of the present invention to design a ball bearing of the class described embodying these and other desirable features. In order that the invention may be more clearly understood, reference is made to the accompanying drawings disclosing a preferred embodiment thereof and in which—

Fig. 1 shows the bearing in axial section, and Fig. 2 a side view thereof.

$a$ designates the inner ring, and $b$ the outer ring. The latter has a path $c$ of spherical form, the centre of which is situated in the centre line of the ball bearing (the shaft axis). The ball paths $k$ for each of the series of balls on the inner ring have, as indicated above, essentially the form of an S-shaped curve, which extends obliquely upwards from the outer side of the inner ring to a central flange projecting between the series of balls. The outer convex part of each ball-path $k$ of the inner ring has its centre ($e$, $e'$, or $f$, $f'$) situated in a plane which passes through the centre of the corresponding ball, when the latter is in normal position, and the centre of the bearing, and on a line in that plane which forms the radius of curvature of the outer ball-path, drawn through the centre of the said ball. The radius of curvature of this convex part of the ball path of the inner ring is less than the radius of curvature of the spherical surface $c$ of outer ring $b$ by at least the diameter of one of the balls. Preferably it should be even less than this. As indicated on Fig. 1, $d$ is the center of the bearing member, and the center of spherical surface $c$. The points $e$, $e'$, $f$, $f'$ are the respective centers of curvature of the several convex bearing surfaces of the inner member $a$. These distances $de$ $d$ $f$ etc. should be sufficient to result in a substantial eccentricity between these convex surfaces and the concave surface $c$. Thus, the cooperating bearing surfaces of each race approach each other in the direction of a medial plane.

The radius of the concave part of each ball-race $k$, on the other hand, has its centre ($g$, $g'$ or $h$, $h'$) situated on the radius of curvature of the ball-path of the outer ring, passing through the centre of the ball and between the said centre and the ball's point of contact with the ball-path of the outer ring. The advantage of this shape of the ball-path of the inner ring, in combination with the above stated shape of the ball-path of the outer ring, is that the balls will be kept, by the force of friction, in the track intended for them. For, assuming that some ball in one of the rows of balls is displaced some distance from its normal position in a direction from the plane of symmetry of the bearing at right angles to the centre of the bearing, and the lateral displacement is slight, so that the ball is still in contact with the surrounding paths and touches them— as a ball always must do by reason of elastic deformation—not merely in points of contact, but also in small surfaces which in axial section form straight or slightly curved lines, if these lines are assumed to be straight and to form tangents to the ball-paths, then the deformed ball can, in reality, be regarded as a cone which, as such, strives to swivel round its point, which will lie, looking from the ball, in the direction of the above mentioned plane of symmetry of the bearing. This follows from the fact that the bearing surfaces of both inner and outer members $a$ and $b$ approach each other in the direction of a medial plane. The ball will thus have a tendency to roll up towards its original and normal position.

The amount of the force which strives to carry the ball into this position, is proportional to the pressure acting upon it and the coefficient of friction. Whether this home-driving force is sufficiently great to return the ball to normal position depends on the magnitude of this force as compared with another force which also acts on the ball, namely the resultant of the pressures acting on the ball. As, however, the angle between the lines of pressure acting on the ball in the case of an elementary lateral displacement is inappreciably small, whereas the coefficient of friction has a definite, by no means inappreciable value, the home-driving force will thus always be the determining factor in the direction of movement of the balls, and the ball will be forced up into its normal position.

It has been assumed above that the axial sections of the plane of contact are straight lines. Should this, however, not be the case in reality, purely conical swivelling cannot be produced, and the swivelling will then take place round a point obtained by the intersection of the medial secants of the lines of sections. This point, however, lies in the same direction as the point of the above-mentioned cone, whence the result will be the same.

In accordance with the present invention, however, the inner ring is not solely convex, the part which lies between the normal series of balls, and which thus occupies the plane of symmetry of the bearing at right angles to the axis of the bearing, having the form of a flange. This flange has partly the function of separating the two rows of balls from one another and of thereby determining the highest and normal positions of the row of balls, but also another function, namely that of increasing the size of the ball's surface of contact to the inner ring. In regard to the strength of the material used, the crushing stress per unit of surface should, as far as possible, be equally great in the outer places of contact as in the inner. As the outer ball-path has the form of a concave spherical surface, the ball to a certain extent fits to it, so that a certain pressure on the ball produces a resting surface which is greater than that which is obtained if the ball by the same force is pressed against a plane or a convex surface. Owing to the flange form of the inner ball-path, which in axial section through a ball and the centre line of the bearing, is curviform, with centres on the radii drawn from the centre of the outer ball-path to the normal points of contact of the balls with the outer ball-race, the inner ball-race also affords the balls an adjustment which is greater than if the inner ball race had been entirely spherical, and the pressure per unit of surface will thereby be less.

The present invention also renders it possible for the balls to be directly introduced into their normal position without any inserting-grooves, or any turning of the inner ring in relation to the outer ring, hence if a ball has been ruptured, a new ball can be introduced from the side of the bearing, the shaft not requiring to be removed from its position.

In the form of the invention illustrated on the drawing the inner ring of the bearing is shown as formed in one piece. It may, however, be composed of two or more annular pieces arranged side by saide, and fastened together by bolts or other means, i. e. the ring as a whole may be divided in two or more parts along planes forming right angles with the centre line of the shaft. In this way an adjustment of the distance between the ball-races in the outer and inner ring can easily be made by interposing pieces of different breadth between the two outer parts of the inner ring, in which the ball-races of the inner ring are formed.

Having thus described my invention, I declare, that what I claim is:—

1. In a double row ball bearing, the combination of an outer ring having its inner face formed as a spherical ball path with its center at the center line of the bearing, an inner ring with its outer surface in the form of symmetrical ball paths on each side of a transverse medial plane, each ball path having in cross section the form of an S- shaped curve composed of a concave portion lying toward said medial plane and a convex portion extending toward the end of the ring, and a plurality of balls between the ball path of the outer ring and each ball path of the inner ring, the space between the edges of the inner ring and the outer ring at the outer sides of said rings being at least as great as the diameter of the balls.

2. In a ball bearing, the combination of a double row of balls, an outer ring having its inner face formed as a spherical ball path with its center at the center line of the bearing, an inner ring with its outer surface in the form of symmetrical ball paths on each side of a transverse medial plane, each ball path having in cross section the form of an S-shaped curve composed of a concave portion lying toward said medial plane and having a radius of curvature the center of which lies on a radius of curvature of the ball path of the outer ring passing through the center of a ball in its normal position and at a point between the center of a ball and its point of contact with the outer ball path, and a convex portion extending toward the end of the ring, the space between the edges of the inner ring and the outer ring at the outer sides of said rings being at least as great as the diameter of the balls.

3. In a ball bearing, the combination of a double row of balls, an outer ring having its inner face formed as a spherical ball path with its center at the center line of the bearing, an inner ring with its outer surface in the form of symmetrical ball paths on each side of a transverse medial plane, each ball path having in cross section the form of an S-shaped curve composed of a concave portion lying toward said medial plane, and a convex portion extending toward the end of the ring and having a radius of curvature the center of which lies on a radius of curvature of the ball path of the outer ring passing through the center of a ball in normal position, this radius of curvature being less than the radius of the ball path of the outer ring by more than the diameter of a ball, the space between the edges of the inner ring and the outer ring at the outer sides of said rings being at least as great as the diameter of the balls.

4. In a double row ball bearing, the combination of an outer ring having its inner face formed as a spherical ball path with its center at the center line of the bearing, an inner ring with its outer surface in the form of symmetrical ball paths on each side of a transverse medial plane, each ball path having in cross section the form of an S-shaped curve composed of a concave portion lying toward said medial plane and a convex portion extending toward the end of the ring, and a plurality of balls between the ball path of the outer ring and each ball path of the inner ring, the normal position of each of said balls being such that its center lies on a radius of curvature of the outer ball path passing between the said concave and convex portions of the inner ball path, the space between the edges of the inner ring and the outer ring at the outer sides of said rings being at least as great as the diameter of the balls.

In testimony whereof I affix my signature.

KONRAD WERNER LINDMAN.

Witnesses:
 AUG. HAGELIN,
 ALMA PETTERSSON.